(12) United States Patent
Kinns (10) Patent No.: US 8,577,672 B2
(45) Date of Patent: Nov. 5, 2013

(54) AUDIBLE ERRORS DETECTION AND PREVENTION FOR SPEECH DECODING, AUDIBLE ERRORS CONCEALING

(75) Inventor: Graham Kinns, Cambridge (GB)

(73) Assignee: Audax Radio Systems LLP, Warwickshire (GB)

( * ) Notice: Subject to any disclaimer, the term of this patent is extended or adjusted under 35 U.S.C. 154(b) by 813 days.

(21) Appl. No.: 12/528,757

(22) PCT Filed: Feb. 27, 2008

(86) PCT No.: PCT/GB2008/000651
§ 371 (c)(1), (2), (4) Date: Aug. 26, 2009

(87) PCT Pub. No.: WO2008/104763
PCT Pub. Date: Sep. 4, 2008

(65) Prior Publication Data
US 2010/0114565 A1 May 6, 2010

(30) Foreign Application Priority Data
Feb. 27, 2007 (GB) .................................. 0703795.5

(51) Int. Cl.
*G10L 19/00* (2013.01)

(52) U.S. Cl.
USPC ........... 704/201; 370/352; 370/466; 375/347; 455/423; 455/426.1; 704/211; 704/214; 704/219; 704/222; 704/226; 704/228; 704/270; 713/151; 714/746; 714/747

(58) Field of Classification Search
USPC ............... 455/423, 426.1; 704/214, 201, 211, 704/219, 222, 226, 228, 270; 370/352, 466; 375/347; 713/151; 714/746, 747
See application file for complete search history.

(56) References Cited

U.S. PATENT DOCUMENTS

| 5,097,507 | A | * | 3/1992 | Zinser et al. ................... 704/226 |
| 5,473,727 | A | * | 12/1995 | Nishiguchi et al. ........... 704/222 |
| 5,526,366 | A | * | 6/1996 | Jarvinen et al. ............... 714/747 |
| 5,710,781 | A | * | 1/1998 | Zinser et al. ................... 714/747 |

(Continued)

FOREIGN PATENT DOCUMENTS

| DE | 4202654 | 8/1993 |
| EP | 0440335 | 8/1991 |

(Continued)

OTHER PUBLICATIONS

International Search Report dated May 28, 2008, PCT Patent Appl. No. PCT/GB2008/000651.

(Continued)

*Primary Examiner* — Michael Colucci
(74) *Attorney, Agent, or Firm* — Ober, Kaler, Grimes & Shriver; Royal W. Craig (57) ABSTRACT

A method and apparatus of providing an audio output to a user in a communications system in which the audio to be output to a user, preferably an audio frame, is assessed before it is broadcast to the user, and then selectively changed on the basis of the assessment. The assessment may be carried out in the audio encoding process, in the audio decoding process and/or after the audio decoding process. The selective changing of the audio output may comprise selectively replacing the audio output and/or re-encoding of the audio output.

10 Claims, 1 Drawing Sheet

(56) References Cited

U.S. PATENT DOCUMENTS

| | | | |
|---|---|---|---|
| 5,918,204 A * | 6/1999 | Tsurumaru | 704/214 |
| 5,978,760 A | 11/1999 | Rao | |
| 5,987,406 A | 11/1999 | Honkanen | |
| 5,987,407 A | 11/1999 | Wu | |
| 6,055,497 A * | 4/2000 | Hallkvist et al. | 704/228 |
| 6,104,991 A | 8/2000 | Newland | |
| 6,272,190 B1 * | 8/2001 | Campana, Jr. | 375/347 |
| 6,530,055 B1 * | 3/2003 | Fukunaga | 714/746 |
| 6,772,112 B1 * | 8/2004 | Ejzak | 704/201 |
| 6,968,309 B1 * | 11/2005 | Makinen et al. | 704/219 |
| 7,401,022 B2 * | 7/2008 | Ahonen | 704/270 |
| 7,751,432 B2 * | 7/2010 | Martin et al. | 370/466 |
| 2002/0066012 A1 * | 5/2002 | Relander et al. | 713/151 |
| 2002/0066013 A1 * | 5/2002 | Relander et al. | 713/151 |
| 2002/0196781 A1 * | 12/2002 | Salovuori | 370/352 |
| 2003/0036382 A1 * | 2/2003 | Chen | 455/423 |
| 2004/0172402 A1 | 9/2004 | Jabri | |
| 2004/0210440 A1 | 10/2004 | Lashkari | |
| 2005/0008007 A1 * | 1/2005 | Yang | 370/352 |
| 2007/0156395 A1 * | 7/2007 | Ojala | 704/211 |
| 2009/0239527 A1 * | 9/2009 | Forsten et al. | 455/426.1 |

FOREIGN PATENT DOCUMENTS

| | | |
|---|---|---|
| EP | 0743773 | 11/1996 |
| EP | 0746116 | 12/1996 |
| EP | 1071076 | 1/2001 |
| EP | 1231597 | 8/2002 |
| EP | 1359567 | 11/2003 |
| GB | 2254760 | 10/1992 |
| GB | 2368761 | 5/2002 |
| WO | WO93/16465 | 8/1993 |
| WO | WO98/39768 | 9/1998 |
| WO | WO01/67699 | 9/2001 |
| WO | WO01/95313 | 12/2001 |

OTHER PUBLICATIONS

UK Search Report dated Jun. 3, 2008, UK Patent Appl. No. GB0803652.7.

UK Search Report dated Nov. 8, 2007, UK Patent Appl. No. GB0703795.5.

* cited by examiner

AUDIBLE ERRORS DETECTION AND PREVENTION FOR SPEECH DECODING, AUDIBLE ERRORS CONCEALING

BACKGROUND

The present invention relates to speech encoding and decoding in communications systems and in particular to speech encoding and decoding in the TETRA (TErrestrial Trunked RAdio) mobile communications system.

The TETRA speech CODEC compresses input speech into a plurality of separate speech "frames". Each speech frame represents 30 ms of sampled speech and contains 137 bits of information.

The TETRA speech CODEC is described in detail in ETSI EN 300 395-2 V1.3.1 (2005-01): Terrestrial Trunked Radio (TETRA); Speech codec for full-rate traffic channel; Part 2: TETRA Codec.

In a TETRA system, when the encoded speech is to be transmitted, the channel coding on the TETRA traffic channel (TCH/S) breaks, on a frame-by-frame basis, the 137 bits of each speech frame into 3 groups and sets one of the bit groups as a "high" error protection bit group, one bit group as a "medium" error protection bit group, and the other bit group as a "no" ("none") error protection bit group.

The effect of this, inter alia, is that no error detection or correction is possible for the "no" ("none") error protection bit group of an encoded speech frame, but a certain level of bit errors are correctable (but not detectable) for the medium protection bit group. Bit errors introduced between the transmitter and receiver can only be detected for the high protection bit group.

While the TETRA speech coding arrangement generally works well in practice, the Applicants have found that the TETRA CODEC contains a design weakness that can be exposed in a real-world radio (RF) environment.

In particular, in the TETRA speech coding arrangements, a number of the bits in a speech frame represent three index values which are each used to index a codebook.

The output from this index lookup is 10 roots of a polynomial representing the nearest encoding for the 30 ms of speech that the speech frame in question represents (encodes). This polynomial, as is known in the art, in effect creates a model of the vocal tract that changes with every speech frame in order to model the changing voice (speech).

The Applicants have found that bit errors in a received speech frame can cause the derived codebook index values to extract an inconsistent set of values (polynomial roots) from the codebook tables. Moreover, if these bit errors are introduced in the traffic channel, they will not be detected save for possibly in the high error protection bit group of the speech frame. Furthermore, the stability checks currently provided in TETRA speech decoders are unable to identify such errors, if they arise, at the decoding side of the process.

The Applicants have further found that the effect of such an error arising in the codebook index values and extraction can be to cause the impulse response of the TETRA decoder filter to go unstable. This can cause the TETRA decoder effectively to resonate around certain frequencies and lead to a full-scale output high-pitched squeal that can potentially persist for many seconds. This is undesirable and can cause discomfort to the radio user.

There is therefore an error situation in TETRA speech decoding that is not currently detected or avoided with existing TETRA equipment, and that can cause undesirable discomfort to TETRA radio users.

SUMMARY

According to a first aspect of the present invention, there is provided a method of providing audio output from a speech decoder to a user in a communications system, the method comprising:
assessing the decoded audio output from the speech decoder before it is broadcast to the user; and
selectively changing the audio output that is broadcast to the user on the basis of the assessment of the audio output from the speech decoder.

According to a second aspect of the present invention, there is provided an apparatus for providing audio output from a speech decoder to a user, the apparatus comprising:
means for assessing the decoded audio output from the speech decoder before it is broadcast to a user; and
means for selectively changing the audio output that is broadcast to a user on the basis of the assessment of the audio output from the speech decoder.

In the present invention, the audio output from a speech decoder (e.g. from the TETRA CODEC in a TETRA system) is assessed before that output is broadcast to (played to) the user, and the audio output that is broadcast to the user is selectively changed on the basis of that assessment.

This will allow, for example, the audio output from the speech decoder to be changed before it is broadcast to (audibly reproduced to) the user, for example, if the assessment of the audio output from the speech decoder indicates that that audio output is unsuitable or unstable. In other words, rather than simply always and automatically broadcasting the audio output from the speech decoder to the user, in the present invention there is an extra stage of first assessing, and if necessary, changing, the audio output before it is broadcast to the user.

This arrangement of the present invention would accordingly allow, for example, and in particular, the above discussed audio errors in a TETRA system to be detected, and, e.g., compensated for and/or mitigated, notwithstanding the fact that they may not be detected by error protection in use or in the TETRA speech decoder itself.

The audio output of (i.e. the decoded speech emitted by) the speech decoder can be assessed in any desired and suitable fashion. In a preferred embodiment, the assessment is such as to provide a measure of the quality of the decoder output. Preferably an assessment of the likely instability (or otherwise) of the decoder output is made. Most preferably samples of a parameter or parameters of the decoded output are taken.

In a particularly preferred embodiment, the assessment of the audio output is carried out on an audio-frame by audio-frame basis, such that each decoded audio frame output by the speech decoder is assessed (and selectively changed) individually. Thus the invention preferably comprises a step of or means for assessing a decoded audio frame output by the speech decoder and selectively changing that output audio frame on the basis of the (its) assessment.

Other arrangements would, of course, be possible.

It would be possible in these arrangements to assess (e.g. sample) the entirety of the (each) audio output frame output by the speech decoder. However, in a particularly preferred embodiment, only a portion of the (each) output frame is assessed (sampled). Preferably the latter part of the (each) audio output frame is assessed. Most preferably the final quarter of a (each) output audio frame is assessed (sampled). Thus, in a TETRA system, preferably the final sub-frame (the last 7.5 ms in a 30 ms TETRA audio frame) and only the final sub-frame, of a (each) decoded audio frame is assessed (sampled).

The Applicants have realised that only assessing a portion of the output frame, rather than the whole frame is advantageous, e.g., in terms of the processing effort required and efficiency (which is particularly important in the real-time audio decoding environment of a communications terminal, for example).

Moreover, the Applicants have realised that, particularly in the case of a TETRA system, if the audio output is unstable in the earlier parts of the frame it is likely also to be unstable in the later parts (e.g. quarter) of the frame, and, furthermore, in a TETRA system at least, the audio output is in fact more likely to go unstable in the last quarter of a frame (as the coding of that frame in a TETRA system is entirely dependent on the codewords received for the frame in question (whereas the first three sub-frames also use some interpolation of the quantised LSP (Line Spectral Pair) vectors from previous TETRA audio frames). Thus, even if only the last quarter of the frame is assessed, that should be sufficient to determine whether the decoded audio frame is acceptable or not.

In a particularly preferred embodiment, the assessment of the audio output of the speech decoder comprises comparing the measure of the quality, etc., and/or the sampled parameter or parameter values, of the decoded audio output with one or more, preferably predetermined, threshold and/or reference measures and/or parameter value(s). The reference and/or threshold measurements or values, etc., could, for example, and preferably are, previously determined by, for example, testing to determine what forms of audio output are acceptable (e.g., will be stable when broadcast) and what forms should not be accepted.

In a particularly preferred such embodiment, the assessment comprises determining what proportion of and/or how many of the sample output values have a magnitude greater than or equal to, or greater than, a particular, preferably selected, preferably predetermined, threshold value or values. Most preferably, if the number and/or proportion of the sample output values that have a magnitude above (as appropriate) the threshold magnitude value or values, equals, or exceeds, a particular, preferably predetermined, preferably selected, threshold proportion of (preferably 75% of), and/or number of, the samples, the audio output is assessed as being "unacceptable" ("unstable").

In a particularly preferred embodiment, which is particularly, but not exclusively, suited to a TETRA communications system, the assessment of the audio output of the speech decoder comprises taking PCM (Pulse Code Modulation) samples of an (and preferably of each) audio output frame. Most preferably the magnitude of the PCM samples (output values) is assessed.

In a particularly preferred such embodiment, the assessment comprises determining what proportion of and/or how many of the PCM sample output values have a magnitude greater than or equal to, or greater than, a particular, preferably selected, preferably predetermined, threshold magnitude. The threshold magnitude preferably corresponds to substantially full-scale (maximum magnitude) sample values, i.e. such that the assessment is to detect near (substantially) full-scale (maximum magnitude) samples (values) in the output signal (frame).

Most preferably, if the number and/or proportion of PCM sample output values that have a magnitude above (as appropriate) the threshold magnitude value, equals or exceeds, or exceeds, a particularly, preferably selected, preferably predetermined, threshold proportion of (preferably 75% of), and/or number of, the samples, the audio output is assessed as being "unstable".

In a preferred arrangement, particularly where the last quarter of a TETRA audio frame is being assessed, preferably 60 PCM output values are sampled in the last quarter (sub-frame) of the audio frame, and if 45 or more of the 60 sampled values have a magnitude of 32760 or greater (out of a maximum magnitude of 32767), the frame is assessed as being unstable.

The way that the output audio (e.g. frame) is changed on the basis of the assessment of the output audio (e.g. frame) can be selected and arranged as desired. In a preferred embodiment, the assessment is such as to determine whether the output audio (e.g. frame) is acceptable or not (e.g., based on a comparison with reference or threshold values, as discussed above), and if the decoded output (e.g. decoded frame) is found to be acceptable it is broadcast to the user in the normal way (it is not changed), but if the decoded output (e.g. frame) is assessed to be unacceptable, the output (e.g. frame) is changed.

Where the decoded audio output (e.g. on a decoded output audio frame) is to be changed in accordance with the present invention, then such changing of the output audio (frame) before it is broadcast to the user could, e.g., comprise altering or modifying the assessed decoded audio output (e.g. frame) before it is broadcast to the user. However, in a particularly preferred embodiment the decoded audio output (e.g. frame) emitted from the speech decoder is replaced if it is assessed to be unacceptable (e.g., unstable). Thus, in a particularly preferred embodiment, the present invention comprises a step of or means for selectively replacing the assessed decoded output (e.g. audio frame) output by the speech decoder on the basis of the assessment of that audio output.

Thus, according to a third aspect of the present invention, there is provided a method of providing audio output from a speech decoder to a user of a communications system, the method comprising:

assessing the audio output from the speech decoder; and
selectively replacing the audio output on the basis of the assessment of the audio output from the speech decoder.

According to a fourth aspect of the present invention, there is provided an apparatus for providing audio output from a speech decoder to a user, the apparatus comprising:

means for assessing the audio output from the speech decoder; and
means for selectively replacing the audio output on the basis of the assessment of the audio output from the speech decoder.

As will be appreciated by those skilled in the art, these aspects and embodiments of the invention can and preferably do include any one or more or all of the preferred and optional features of the invention described herein, as appropriate. Thus, for example, the assessment of the audio output emitted by the speech decoder is preferably performed on an audio frame by audio frame basis, and/or preferably comprises sampling a value or values of the output and comparing the sample results to a set of reference and/or threshold values or value.

In one preferred arrangement of these aspects and embodiments of the present invention, the unacceptable audio output (e.g., and preferably, frame) is replaced with silence (e.g., and preferably, a silent frame). In a TETRA system, for example, an unstable 30 ms output audio frame could be replaced by 30 ms of silence.

In another preferred embodiment, the unacceptable audio output (e.g. frame) is not replaced by silence but is replaced with a different audio signal, such as, and preferably, audio (an audio frame) that is an approximation of the intended output audio (frame), which approximation may be, and preferably is, for example, based on a previous, and/or the intended, audio output (e.g. output audio frame). This may be preferable to users rather than emitting silence. For example, in a TETRA system, the Bad Frame fill-in algorithm could be, and in a preferred embodiment is, used to generate a frame to replace an unacceptable audio frame.

As well as changing (e.g., replacing) the decoded audio output (e.g. frame) if it is assessed to be unacceptable, the system and method of the present invention preferably also changes (alters) the decoder state. The Applicants have recognised that this may help to, e.g., avoid the erroneous state of the unacceptable audio output (e.g. frame) being propagated to subsequent audio outputs (e.g. frames)), which would otherwise sustain the generation of the unacceptable audio output (even if the unacceptable audio output is subsequently being compensated for in the decoder). This may be particularly desirable in a system such as a TETRA system where, as is known in the art, coding values (quantised linear prediction values in TETRA) derived in previous frames are used when decoding a current frame.

Indeed, the Applicants have recognised that such an arrangement may be particularly advantageous as it can facilitate more rapid termination of the generation of an undesired audio output (e.g. a high-pitched squeal ("squawk")), and allow the decoder to more rapidly return to normal operation.

Thus, in a particularly preferred embodiment, the present invention comprises a step of or means for selectively changing the decoder state on the basis of the assessment of the decoded audio output emitted by the decoder.

It is believed that such an arrangement may be new and advantageous in its own right, even if, for example, the audio output broadcast to the user is not changed, as it can still avoid an erroneous output state being propagated to subsequent audio frames.

Thus, according to a fifth aspect of the present invention, there is provided a method of operating a speech decoder, the method comprising:

assessing the decoded audio output emitted by the speech decoder; and selectively changing the speech decoder's state on the basis of the assessment of the audio output from the speech decoder.

According to a sixth aspect of the present invention, there is provided an apparatus for use with a speech decoder, the apparatus comprising:

means for assessing the decoded audio output emitted by the speech decoder; and means for selectively changing the speech decoder's state on the basis of the assessment of the audio output from the speech decoder.

As will be appreciated by those skilled in the art, those aspects and embodiments of the present invention can and preferably do include any one or more or all of the preferred and optional features of the invention described herein. Thus, for example, the audio output broadcast to a user is preferably also changed based on the assessment of the audio output by the decoder.

In a preferred arrangement of these aspects and embodiments of the present invention, the selective changing of the state of the decoder is based on whether the decoder output is assessed to be acceptable or not (which may be done, for example, and preferably, in the manner or manners discussed above). Most preferably, if the output is assessed to be unacceptable, the state is changed, but not otherwise.

Where the decoder state is to be changed, then in one preferred embodiment, the changing of the decoder state comprises resetting the decoder. This may particularly be appropriate where the unacceptable audio output frame is replaced with silence (and thus in a preferred embodiment, the decoder is reset and a silent frame is output, if it is determined that the output audio frame emitted by the decoder is unacceptable).

In a preferred embodiment, such resetting of the decoder state comprises re-initialising one or more parameters and/or values of the decoder (i.e. setting them back to their initial and/or default values). Thus, in a TETRA system, for example, it comprises setting the values of the past quantised LSP (Line Spectral Pair) vector back to their default (initial) values as defined in the TETRA standard.

In another preferred embodiment, rather than resetting the decoder, it is instead set to a modified and/or altered state, for example, and preferably, based on interpolated speech parameters for the audio output (e.g. frame) in question. In a TETRA system, this could, for example, be done, and is preferably done, using the TETRA Bad Frame processing algorithm. This arrangement may be more suitable where an unacceptable output audio frame is to be replaced with an interpolated or approximated speech frame, rather than with silence.

It will be seen from the above that in the preferred embodiments of the present invention at least, the audio output emitted from a speech decoder is assessed for instability and/or errors, and in the event of instability, etc., being detected, the output audio is replaced and the decoder reset, thereby avoiding or reducing audio discomfort to the user.

The above arrangements of the present invention involve assessing and detecting audio frame instability of an audio frame output from (emitted from) the speech (audio decoder), i.e. attempt to detect any instability externally of the speech decoder (CODEC).

In a preferred embodiment, the present invention further comprises a step of or means for assessing the received encoded audio signal within the speech decoder (CODEC). This would then provide a two-stage process for detecting instability in the signal, firstly within the decoder and then externally of it. Such an arrangement may further reduce the possibility of an unstable frame being broadcast to a user.

It would also, as will be discussed further below, be possible to use such an assessment of the received encoded audio signal within the speech decoder instead of the above discussed assessment of the decoded signal output by the decoder (i.e. to only assess the signal within the decoder, not only in combination with also assessing the signal externally of the decoder).

In this arrangement, the assessment of the received encoded audio signal in the decoder can be carried out in any desired and suitable manner. In a particularly preferred embodiment, it comprises assessing the received encoded speech parameters (e.g., and preferably, the parameters which are to be used to reconstruct the vocal tract model).

In a particularly preferred embodiment, particularly in a TETRA system, a roots check (e.g., and preferably, a check on the values of some or all of the (ten in a TETRA system) polynomial roots derived in the encoding and/or decoding process) is carried out for the purpose of assessing the received encoded signal in the decoder (e.g., and preferably, to determine whether the received and/or derived roots in the decoding process lie within a predetermined threshold value or values or not).

Most preferably, particularly in a TETRA system, it is determined whether or not the derived roots of the decoder's linear prediction filter lie outside the unit circle. The Applicants believe that this may be a particularly advantageous technique to use, particularly in a TETRA system, as they believe that the potential instability discussed above in relation to TETRA systems may be caused by the bit errors and subsequent erroneous processing causing the roots of the decoder's LP filter to lie outside the unit circle. Performing a roots check in the decoder allows this situation to be detected.

In another preferred embodiment, the assessment of the audio signal within the decoder comprises also or instead determining whether the LSP (line spectral pair) frequencies in the received encoded signal are too close together (e.g., and preferably, to determine whether the line spectral pair frequencies are closer than a predetermined threshold value or values to each other or not). Most preferably, particularly in a TETRA system, it is determined whether or not the line spectral pair frequencies are more than 50 Hz apart. Again, the Applicants believes that the instability in the TETRA CODEC may be caused by the LSP frequencies being too close together and thereby causing resonances at specific frequencies. Thus by assessing this, a potentially unstable signal can be determined.

Such determination can be carried out as desired, but is preferably done using the values in the cosine domain. Most preferably only certain distances in the 10 roots output in a TETRA CODEC are tested, and most preferably only the distances at the "joins" between codebooks are tested (since any internal codebook values should be correctly spaced).

It is believed that an arrangement in which potential instability of an audio output is assessed within a speech decoder may be new and advantageous in its own right, as it would, for example, and as discussed above, allow instability to be detected whether or not there is any subsequent assessment of the output of the decoder.

Thus, according to a seventh aspect of the present invention, there is provided a method of operating a speech decoder, the method comprising:

assessing the received encoded signal within the decoder as it decodes a received encoded signal in use, so as to determine whether or not the decoder could output a potentially unstable decoded output signal.

According to an eighth aspect of the present invention, there is provided a speech decoder or an apparatus for use in or with a speech decoder, the decoder or apparatus comprising:

means for assessing a received encoded signal within the decoder as it decodes a received encoded signal in use, so as to determine whether or not the decoder could output a potentially unstable decoded output signal.

As will be appreciated by those skilled in the art, these aspects and embodiments of the present invention can and preferably do include any one or more or all of the preferred and optional features of the invention described herein, as appropriate. Thus, for example, the assessment of the signal in the decoder preferably comprises performing a roots check and/or determining whether the LSP frequencies are too close together, preferably on a frame-by-frame basis, as discussed above.

In these aspects and embodiments of the invention, if the assessment of the signal in the decoder suggests that the signal is unacceptable and/or unstable, etc., then in a particularly preferred embodiment, the output audio signal is changed (e.g., and preferably, replaced with silence or an approximated speech frame) and/or the decoder state is changed (e.g., reset), as discussed above in relation to when an unacceptable audio output (e.g. frame) by the decoder is detected.

In these arrangements, the changing, etc., of the output signal and/or of the decoder state can preferably be and is preferably, carried out in and/or using any one or more or all of the manners and techniques discussed above in relation to when this is done in response to detecting an unsuitable output audio frame, etc., that has been emitted by the decoder.

It could also, or instead, for example, comprise identifying (detecting) specific (e.g., predetermined) patterns (value(s)) in the received encoded signal (e.g., that are known to cause instability), and remapping those patterns (values) to (replacing those patterns (values) with), alternative, preferably predetermined, patterns (values) (e.g., and preferably that are known to be safer (e.g., more stable)).

Thus, according to a ninth aspect of the present invention, there is provided a method of providing audio output from a speech decoder to a user, the method comprising:

assessing the received encoded audio signal within the decoder as it decodes a received encoded signal in use; and selectively changing the audio output that is broadcast to a user on the basis of the assessment of the signal within the speech decoder.

According to a tenth aspect of the present invention, there is provided a speech decoder or an apparatus for use with or in a speech decoder, the decoder or apparatus comprising:

means for assessing a received encoded audio signal within the decoder as it decodes a received encoded signal in use; and means for selectively changing the audio output that is broadcast to a user on the basis of the assessment of the signal within the speech decoder.

According to an eleventh aspect of the present invention, there is provided a method of operating a speech decoder, the method comprising:

assessing a received encoded audio signal within the decoder as it decodes the received encoded signal in use; and selectively changing the state of the speech decoder on the basis of the assessment of the signal within the speech decoder.

According to a twelfth aspect of the present invention, there is provided a speech decoder or an apparatus for use with or in a speech decoder, the decoder or apparatus comprising:

means for assessing a received encoded audio signal within the decoder as it decodes the received encoded signal in use; and means for selectively changing the state of the speech decoder on the basis of the assessment of the signal within the speech decoder.

Again, as will be appreciated by those skilled in the art, these aspects and embodiments of the invention can and preferably do include any one or more or all of the preferred and optional features of the invention described herein, as appropriate. Thus, for example, preferably a roots check on the received encoded signal is performed, and/or the output audio frame is selectively replaced (e.g. with silence) based on the assessment, etc.

In the above embodiments and aspects of the invention, various techniques are proposed and performed at the decoding side of the speech encoding and decoding process in order to try to reduce the possibility of an unstable audio output to the user.

However, the Applicants have further recognised that it would also be possible to take steps at the encoding side of the process that would help to reduce the possibility of an unstable audio output to the receiving user.

In particular, the Applicants have found firstly that, in a TETRA system at least, certain encoded codebook index values are more common than others in speech encoded in certain environments, and, moreover, that some of these commonly transmitted values are more prone to single bit-error corruption that can cause audio instability in the decoder in a moderate bit error rate environment.

The Applicants have accordingly recognised that if the encoding process could be configured to avoid these particularly error-prone and sensitive values (i.e. if the encoder were configured to avoid transmitting these sequences that the Applicants have found are prone to corruption), then there would be less chance of audio instability at the receiver.

Thus, in a particularly preferred embodiment, the present invention further comprises the encoding side of the audio encoding and decoding process, and comprises, at the encoding side, modifying the encoding process so as to avoid transmitting sequences known to be prone to corruption.

Thus, in a particularly preferred embodiment, the present invention further comprises steps of or means for encoding speech for transmission, assessing the speech as it is encoded, and selectively changing the encoded speech on the basis of the assessment.

As will be appreciated by those skilled in the art, it would again be possible to use this arrangement at the encoding side in combination with one or both of the above described arrangements at the decoding side, or on its own (i.e. not in combination with (instead of) the above-described arrangements at the decoding side).

Thus, it is again accordingly believed that such encoding arrangements may in fact be new and advantageous in their own right, as they offer a potential solution to the problem of audio instability at the receiver in the encoding side of the process.

Thus, according to a thirteenth aspect of the present invention, there is provided a method of encoding speech for transmission in a communications system, the method comprising:

assessing the speech as it is encoded; and
selectively changing the encoded speech on the basis of the assessment.

According to a fourteenth aspect of the present invention, there is provided an apparatus for encoding speech for transmission in a communications system, the apparatus comprising:

means for assessing the speech as it is encoded; and
means for selectively changing the encoded speech on the basis of the assessment.

As will be appreciated by those skilled in the art, these aspects and embodiments of the present invention can and preferably do include any one or more or all of the preferred and optional features of the invention described herein, as appropriate. Thus they, for example, preferably further comprise one or more of procedures, etc., discussed above at the decoding side for reducing instability in the output audio signal at the receiver.

In these arrangements and aspects of the invention, the assessment of the encoded speech can be carried out as desired, but in a preferred embodiment comprises comparing the speech being encoded (the encoded speech) to one or more reference (encoded) speech values (e.g., and preferably, that are known to be susceptible to instability at the receiver). Most preferably the codebook index values in the encoded speech are compared to one or more reference, preferably predetermined, codebook index values. The reference values for use in these arrangements could, e.g., be determined by testing in advance to find the values that are prone to instability and then storing those values for subsequent use.

In a particularly preferred embodiment of these arrangements and aspects of the invention, the assessment of the encoded speech comprises assessing the encoded speech for the presence of particular, preferably predetermined, codewords. Most preferably the system attempts to detect the presence (or otherwise) of a select number of, and preferably not more than two (such as one or two), selected, preferably predetermined, codewords in the encoded signal (such as a codeword or codewords that are known to cause instability).

The selective changing of the encoded speech in these aspects and embodiments of the invention preferably comprises selectively replacing the relevant parts of the encoded speech with alternative values or parts. Thus, for example, and preferably, if the speech encoding is assessed by comparing it with reference values known to be prone to causing instability, encoded speech that matches such a reference value is preferably replaced with an alternative encoding value (e.g., pattern).

Similarly, where the assessment comprises identifying particular codewords in the encoded speech, then those codewords, if found, are preferably replaced with alternative codewords.

In these arrangements, the replacement (encoded) speech values, pattern or codeword, etc., is preferably based on, and/or an approximation of, the originally intended encoding, but is such as to be less prone to cause instability in the receiver's audio output. In other words, the encoding process preferably operates to identify relatively more error prone encoding patterns, codewords, etc., and to replace those encoding patterns, code words, etc., with similar and/or equivalent less error prone patterns or codewords, etc. This could be done, e.g., by using a look-up table or similar to map known error prone bit patterns, codewords, etc., to equivalent less error prone bit patterns, codewords, etc.

Thus, according to a fifteenth aspect of the present invention, there is provided a method of encoding speech in a communications system, the method comprising:

identifying predetermined bit patterns and/or codeword(s) in the encoded speech and replacing those bit patterns and/or codeword(s) with alternative predetermined bit patterns and/or codeword(s).

According to a sixteenth aspect of the present invention, there is provided an apparatus for use in encoding speech in a communications system, the apparatus comprising:

means for identifying predetermined bit patterns and/or codeword(s) in the encoded speech; and
means for replacing those bit patterns and/or codeword(s) with alternative predetermined bit patterns and/or codeword(s).

As will be appreciated by those skilled in the art, these aspects of the present invention again may and preferably do include any one or more or all of the preferred and optional features of the invention described herein, as appropriate.

These aspects and embodiments of the present invention accordingly preferably further comprise storing one or more reference predetermined bit patterns, codewords, and/or speech index values, etc., in association with one or more replacement predetermined bit patterns, codewords, speech index values, etc. Most preferably there is a set of reference, and/or test bit patterns, codewords, etc., and each test bit pattern, codeword, etc., has associated with it a predetermined replacement bit pattern, codeword, etc. (which it is intended will be used to replace the test bit pattern, codeword, etc., if the test bit pattern and/or codeword, etc., is identified in a speech signal that is being encoded). The replacement bit patterns, codewords, etc., will accordingly preferably be bit patterns, codewords, etc., that are known to be less error prone.

Thus, in a particularly preferred embodiment, the speech encoder (e.g., and preferably look-up) algorithm is configured to map and identify selected, predetermined encoding values (e.g., and preferably, that are known to be more error prone), to alternative selected, predetermined encoding values (e.g., codewords) (e.g., and preferably that are known to be less error prone). Preferably, the speech encoding algorithm is configured to identify selected, predetermined encoding values, codewords, and/or patterns, and to replace any such identified values, codewords, and/or patterns with alternative values, codewords, and/or patterns that have been previously associated with the selected encoding value or values, codeword or codewords, and/or pattern or patterns in question.

In a preferred arrangement, the encoding process also or instead operates to select a replacement bit pattern, and/or codeword, etc., to use based on a calculated and/or approximate error between a proposed replacement codeword or codewords, etc., and the codeword, etc., that is to be replaced. For example, and preferably, the least squared distance between a codeword to be replaced and each of a number of candidate replacement codewords could be determined and used to select the best match (replacement) from the candidate codewords.

In a particularly preferred arrangement of these aspects and embodiments of the invention, particularly where an encoding value (e.g., codeword) has been replaced with an approximate equivalent value (e.g., codeword), the subsequent encoding is modified and/or changed so as to try to compensate for the approximation. For example, particularly in a TETRA system, the approximation could be and preferably is partially or entirely compensated for in the delta encoding of the four sub-frame elements. Thus, in a preferred embodiment, the delta encoding of sub-frame elements in an encoded speech frame is configured so as to try to compensate for any approximation in the bit pattern or value encoding, etc.

It will be appreciated from the above that the present invention, in its most general concepts, comprises assessing a speech frame (e.g., to identify a frame known to be error prone and/or likely to cause instability) and then changing, e.g., replacing, the speech frame accordingly. This may be carried out in the encoder, in the decoder and/or after the decoder, or at any or all of these stages.

Thus, according to a seventeenth aspect of the present invention, there is provided a method of providing an audio output frame to a user in a communications system, the method comprising:

assessing the audio frame before it is broadcast to the user; and selectively changing the audio frame that is to be broadcast to the user on the basis of the assessment of the audio frame.

According to an eighteenth aspect of the present invention, there is provided an apparatus for providing an audio output frame to a user in a communications system, the apparatus comprising:

means for assessing the audio frame before it is broadcast to the user; and means for selectively changing the audio frame that is to be broadcast to the user on the basis of the assessment of the audio frame.

DETAILED DESCRIPTION

Figure 1:
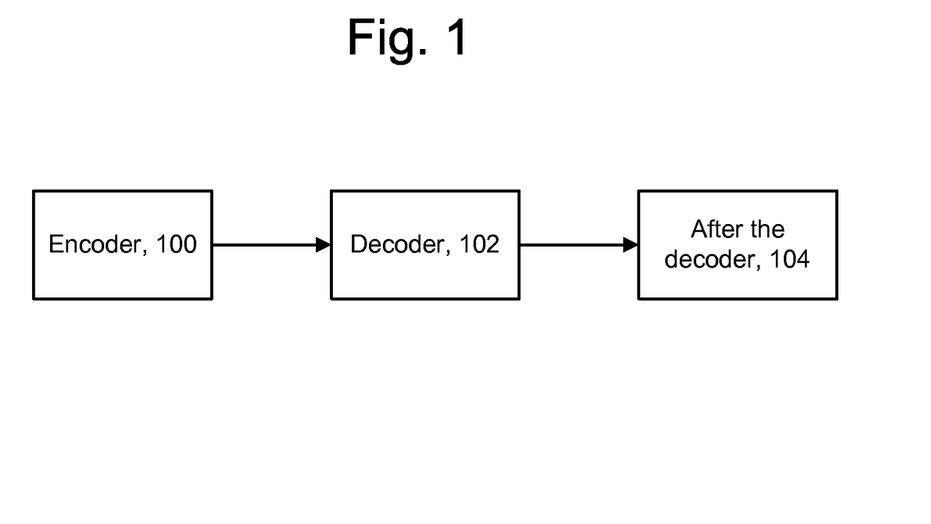
FIG. 1 depicts an example communication system.
Figure 2:
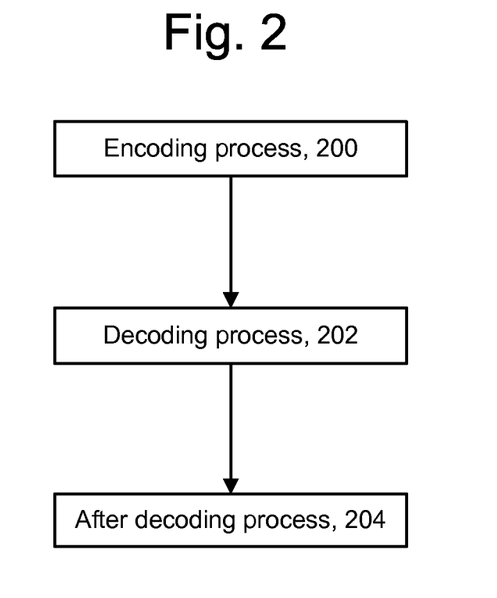
FIG. 2 depicts an example method in a communication system.

As will be appreciated by those skilled in the art, these aspects of the present invention can and preferably do include any one or more or all of the preferred and optional features of the present invention described herein, as appropriate. Thus, for example, the assessment may be and preferably is carried out in the encoding process 200 (the encoder 100), the decoding process 202 (the decoder 102) or after the decoding process 204 (after the decoder 104), or in more than one or all of these. Similarly, the selective changing of the audio frame preferably comprises replacing the frame, and/or the encoding of the frame in one or more of the manners set out above.

The decoder, encoder, CODEC, apparatus, etc., in the present invention can be arranged in any suitable and desired component, etc., of the communications system, such as, and preferably, any component or device, etc., where a speech coder or decoder (CODEC) may be used or required.

As will be appreciated by those skilled in the art the encoder and/or decoder or encoding and/or decoding process will typically be part of and/or provided or used in a communications terminal of the communications system. Thus, in a preferred embodiment, the present invention comprises a method of or apparatus for providing speech output from a speech decoder of a terminal of a communications system (to a user) and/or relates to a decoder or decoding process or apparatus and/or an encoder or encoding process or apparatus for use in and/or with and/or of a terminal of a communications system.

The present invention can be used with any suitable and desired communications terminals, such as, and preferably, mobile terminals (mobile stations) of a mobile communications system. Such terminals may, e.g., be portable or, e.g., vehicle mounted, etc., as is known in the art. It would also be possible for the invention to be used in and for fixed (e.g. fixed line) terminals, such as for and in dispatcher equipment used in a mobile communications system.

As well as being used in communications system terminals, the present invention can equally be applied in other components and devices where a speech decoder and/or encoder (CODEC) may be employed. For example, it could also or instead be used in a "gateway" arrangement, apparatus, and/or device that uses or includes a speech CODEC for interfacing with another communications system.

For example, it is known in TETRA to include a TETRA speech CODEC in a gateway apparatus or device that is to interface between a TETRA system and another communications system that does not use the TETRA CODEC. Examples of such arrangements would be a gateway device for converting TETRA-encoded speech to pulse code modulation (PCM) encoded speech, for example for interconnection to the public switched telephone network (PSTN), a gateway device for interfacing between a TETRA system and a GSM or 3GPP system (which again could decode the encoded TETRA speech to PCM, and then recode that speech using a GSM CODEC, or, alternatively, could use some form of direct transformation between the TETRA encoding and the GSM encoding), and/or a gateway device for conversion between a TETRA system and a satellite-based communications system (such as Iridium phones) (which could again use an intermediate pulse code modulation conversion stage, for example). In these arrangements there would accordingly be a TETRA speech CODEC in the gateway (interface) device, and thus the present invention could equally be applied in these arrangements as appropriate.

It should also be noted here that in a situation where the encoding and/or decoding process is being used in a gateway-type device in this manner, or indeed in other arrangements, it may be that the final audio output that is broadcast to (replayed to) the user is not broadcast to the user by the gateway device (i.e. the device that incorporates the CODEC, encoder and/or decoder) itself, but may be broadcast by another device, such as a terminal, that is remote from the CODEC, etc., (gateway, etc.) device. However, the present invention can still be applied in such circumstances, as it will allow the CODEC, encoder and/or decoder of the gateway device, etc., to avoid transmitting potentially unstable audio output to the end terminal, etc., in any event.

The various processes, etc., of the present invention to be carried out in or by the communications terminals, gateways, etc., can be performed in any suitable and desired components of a communications terminal or terminals, gateway, etc.

The communications system to which the present invention is applied can be any suitable such system. The present invention is particularly applicable to mobile communication systems, such as the TETRA system. Thus the present invention also extends to a mobile communications system, and to a method of operating a mobile communications system, that is in accordance with and/or that can be operated in accordance with, the present invention. The mobile communications system is preferably a TETRA system. The terminal, encoder and/or decoder is accordingly preferably a TETRA terminal, encoder, and/or decoder (CODEC).

As will be appreciated by those skilled in the art, all of the aspects and embodiments of the present invention described herein can and preferably do include, as appropriate, any one or more or all of the preferred and optional features of the invention described herein.

The methods in accordance with the present invention may be implemented at least partially using software e.g. computer programs. It will thus be seen that when viewed from further aspects the present invention provides computer software specifically adapted to carry out the method or a method herein described when installed on data processing means, a computer program element comprising computer software code portions for performing the method or a method herein described when the program element is run on data processing means, and a computer program comprising code means adapted to perform all the steps of a method or of the methods herein described when the program is run on a data-processing system. The invention also extends to a computer software carrier comprising such software which when used to operate a communications system, terminal or apparatus comprising data processing means causes in conjunction with said data processing means said system, terminal or apparatus to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only.

The preferred embodiments of the invention will be described with particular reference to a TETRA mobile communications system. However, as discussed above, while the present invention is particularly applicable to TETRA mobile communications systems, as will be appreciated by those skilled in the art, it is not exclusive to those systems and can be applied to other mobile communications systems and communications systems equally.

In a first embodiment of the present invention, instability in an audio signal to be output is detected externally of the TETRA codec. More particularly, if erroneous, unstable audio output in a speech frame emitted from the CODEC is detected, it is replaced, and the state of the decoder is reset, to avoid audio discomfort to the user, and to avoid erroneous state being propagated to subsequent frames.

The method of this embodiment involves detecting near full-scale PCM (Pulse Code Modulation) samples in an audio output frame as being indicative of potential instability.

In particular, the last 7.5 ms (the last sub-frame) of the decoded 30 ms audio frame is assessed in order to detect instability by sampling 60 PCM output values from this portion of the frame. If 45 or more of the 60 PCM sampled output values in the last sub-frame are found to be of magnitude 32760 or greater (the maximum possible magnitude being 32767), it is assumed that the frame is unstable, and the speech decoder is reset (the values of the quantised LSP (Line Spectral Pair) vector are set back to the initial values given in the last paragraph of clause 4.2.2.3 of the ETSI Standard EN 300 395-2 V1.3.1) and the 30 ms of speech that would be generated by the speech frame is replaced by silence.

A pseudo C code example of a process for carrying out this arrangement is given below:

```
/* definitions of constants */
#define PCM_THRESHOLD               32760
#define SQUAWK_COUNT_THRESHOLD      45
#define L_FRAME                     240
```

```
...
    /* Initialization of decoder */
    Init_Decod_Tetra( );
    /* Loop for each "L_frame" speech data. */
    frame =0;
    while( fread(serial, sizeof(Word16), serial_size,
    f_serial) == serial_size)
    {
    Bits2prm_Tetra(serial, parm);                    /* serial to
    parameters */
    Decod_Tetra(parm, synth);                        /* decoder */
    Post_Process(synth, (Word16)L_frame);            /* Post
    processing of synthesis */
    /* NEW: Additional filter code: */
    if (SquawkFilterEnabled)
    {
    int ClipCount = 0;   /* Count of samples exceeding
    threshold */
    int SampleIndex;
    /* Loop over the last 1/4 subframe */
    for (SampleIdx = L_FRAME − 60; SampleIdx < L_frame;
        SampleIdx++)
    {
    /* Check sample value against clipping threshold */
    if ((synth[SampleIdx] >= PCM_THRESHOLD) ||
        (synth[SampleIdx] <= −PCM_THRESHOLD))
                {
                    ClipCount++;
                }
            }
            if (ClipCount >= SQUAWK_COUNT_THRESHOLD)
            {
                /* Squawk filter invoked */
                /* Reset decoder */
                Init_Decod_Tetra( );
                /* Clear output buffer */
                memset (synth, 0, L_frame * sizeof(Word16));
            }
        }
        fwrite(synth, sizeof(Word16), L_frame, f_syn);   /*
    Write output file */
    }
```

An alternative in this embodiment would be to use the TETRA Bad Frame fill-in algorithm to replace the 30 ms of speech that would be generated by the unstable speech frame with an approximation based on the previous speech frame, rather than emitting silence. In this case, the decoder is preferably not reset, but the Bad Frame processing used instead to interpolate speech parameters for the frame.

In a second preferred embodiment, the instability (or otherwise) of the speech frames is detected within the TETRA decoder. In this embodiment, the received encoded frame is tested to determine whether the LSP (line spectral pair) coefficients are too close together in frequency (less than 50 Hz apart).

This is done using the values in the cosine domain. Only certain distances in the 10 roots are tested for discontinuity at the "joins" between the codebooks (since the roots are extracted via codebook lookup and the internal codebook values can be separately proved to be correctly spaced).

If a discontinuity which will lead to instability is detected, the Bad Frame fill-in algorithm is invoked to replace the speech frame.

Such checking of the received encoded frame for potential instability could also or instead be done by performing a roots check, to see if the roots of the decoder's LP (linear prediction) filter lie outside the unit circle.

In a third embodiment of the present invention, the TETRA speech encoder is modified to avoid transmitting sequences known to be prone to corruption.

In particular, the speech encoder lookup algorithm is modified to avoid using certain encoded codebook index values that have been observed during use to be far more prominent than others in speech encoded in certain environments and to be prone to single bit-error corruption in a moderate BER environment (thereby triggering audio instability in the decoder), and to use alternatively a slightly worse approximation for the encoding of the overall speech frame, but which is known to be less prone to errors. The approximation is then partially or entirely compensated for in the delta encoding of the four sub-frame elements.

In other words, the speech encoder maps known error-prone bit patterns to equivalent, replacement, less error-prone patterns, for example by using a suitably configured look up table.

A pseudo C code example of a process for carrying out this arrangement will now be discussed.

In normal TETRA operation, the 3 TETRA codebooks are searched for the nearest match to the 10 LSPs passed in.

The 3rd codebook search routine in pseudo C code is as follows:

```
/* Search dico3 lsp[6]-lsp[9] */
    p_dico = dico3_clsp;
    min    = MAX_32;
    for (i = 0; i< taille_dic3; i++)
    {
        temp = sub(lsp[6], *p_dico++);
        dist = L_mult0(temp,temp);
        for(j=7; j<10; j++)
        {
            temp = sub(lsp[j], *p_dico++);
            dist = L_mac0(dist,temp,temp);
        }
        if (L_sub(dist, min) < 0) { min = dist; ind = i; }
    }
```

In the present embodiment, the last "if" test in the loop is modified to become:

```
if (L_sub(dist, min) < 0)
{
    /* New test: skip 3rd codebook indices 508 and 509
if the
    *          codebook modification is active
    */
    if (Codebook3ModificationEnabled &&
        ((i == 508) || (i == 509)))
    {
        /* Ignore - no action */
    }
    else
    {
        /* Original code */
        min = dist; ind = i;
    }
}
```

This modified test effectively looks for, and replaces (skips over), the TETRA codewords 508 and 509 (being the codewords that have been found in particular to cause audio instability).

The L_sub( ) procedure in the above pseudo code computes the least squared distance for each code word it examines, so if it skips over codewords 508 and 509, it just finds the best match from the remaining codewords.

(The "if (Codebook3ModificationEnabled && . . . " in the above pseudo code looks for a flag that can be set to activate this function in the encoder (if desired).)

In this example, codewords 508 and 509 are skipped over (replaced). This is because these codewords have been found to occur relatively frequently in the audio conditions of the equipment in question. However, in other audio configurations, other troublesome codewords could be more prevalent, and thus the use of codewords 508 and 509 in this example should be seen as being for example only.

In general the most troublesome codewords (and thus the codewords preferentially to replace) are those where a single bit error can cause an undetected shift into a codeword invoking considerably different parameters, such as a sign-change in the phase, etc. (whereas a single bit error in a less troublesome codeword may at worst only cause a small shift in the e.g. phase and gain parameters, which is more acceptable so far as the end audio output is concerned).

It is also preferred to filter out (replace) relatively few codewords (e.g., one or two codewords only) in this manner, as the more codewords that are filtered out, the worse the performance of the encoder (CODEC) may become.

Although the above techniques have been described as separate embodiments, it would, of course, be possible to use two or more of them in combination as well. Thus, for example, a modified encoding process, together with detecting instability within and/or external of the decoder could be used, if desired, and/or a decoding process that assesses instability both within and externally of the decoder could be used.

It can be seen from the above that the present invention, in its preferred embodiments at least, provides techniques for reducing and/or avoiding instability in the output of a speech decoder and thus audio discomfort to a user.

This is achieved, in the preferred embodiments of the present invention at least, by assessing audio frames at and/or after the decoding process and/or during the encoding process, and changing frames found to be likely to cause audio instability, e.g., by replacing them with more stable frames.

The invention claimed is:

1. A method of providing audio output from a Terrestrial Trunked Radio (TETRA) speech decoder to a user in a TETRA communications system, the method comprising:
    assessing only a portion of a decoded audio output frame emitted by the TETRA speech decoder before it is broadcast to the user by taking Pulse Code Modulation (PCM) samples of said portion of said decoded audio output frame and comparing a measure of the quality and/or the sampled parameter or parameter values of the decoded audio frame portion with one or more predetermined threshold and/or reference measures and/or parameter value or values to determine whether or not it is acceptable; and
    replacing the entire audio output frame that is broadcast to the user when said assessed portion is determined to be unacceptable.

2. The method of claim 1, wherein the portion of the decoded audio output frame that is assessed is a final sub-frame consisting only of a last fractional portion of decoded speech of the decoded audio output frame.

3. The method of claim 1 or 2, further comprising selectively changing the state of the decoder on the basis of the assessment of the audio output frame from the speech decoder to avoid an erroneous state of an unacceptable audio frame being propagated to subsequent audio output frames.

4. The method of claim 3, wherein the step of selectively changing the state of the decoder comprises selectively resetting the speech decoder on the basis of the assessment of the audio output frame from the speech decoder.

5. The method of claim 1, further comprising:
    encoding speech in a TETRA speech encoder for transmission to the TETRA speech decoder;
    assessing the speech as it is encoded; and
    selectively changing the encoded speech on the basis of the assessment.

6. An apparatus for providing audio output from a Terrestrial Trunked Radio (TETRA) speech decoder to a user in a TETRA communications system, the apparatus comprising:
    means for assessing only a portion of a decoded audio output frame from the TETRA speech decoder before it is broadcast to the user by taking Pulse Code Modulation (PCM) samples of said portion of said decoded audio output frame and comparing a measure of the quality and/or the sampled parameter or parameter values of the decoded audio frame portion with one or more predetermined threshold and/or reference measures and/or parameter value or values to determine whether or not it is acceptable; and
    means for replacing the entire audio output frame that is broadcast to the user when said assessed portion is determined to be unacceptable.

7. The apparatus of claim 6, wherein the portion of the decoded audio output frame that is assessed is a final sub-frame consisting only of a last fractional portion of decoded speech of the decoded audio output frame.

8. The apparatus of claim 6 or claim 7, further comprising means for selectively changing the state of the decoder on the basis of the assessment of the audio output frame from the speech decoder to avoid an erroneous state of an unacceptable audio frame being propagated to subsequent audio output frames.

9. The apparatus of claim 8, wherein the means for selectively changing the state of the decoder comprises means for selectively resetting the speech decoder on the basis of the assessment of the audio output frame from the speech decoder.

10. The apparatus of claim 6, further comprising:
    means for assessing a received encoded audio signal within the TETRA speech decoder as it decodes the received encoded signal in use; and
    means for selectively changing the audio output that is broadcast to the user on the basis of the assessment of the signal within the TETRA speech decoder.

* * * * *